US009503220B2

(12) United States Patent
Naaman et al.

(10) Patent No.: US 9,503,220 B2
(45) Date of Patent: *Nov. 22, 2016

(54) METHOD FOR REDELIVERING A SUBSET OF MESSAGES IN A PACKET TO A RECEIVER APPLICATION

(71) Applicant: International Business Machines Corporation, Armonk, NY (US)

(72) Inventors: Nir Naaman, Haifa (IL); Ian Robinson, Southhampton (GB); Lohitashwa Thyagaraj, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/831,289

(22) Filed: Aug. 20, 2015

(65) Prior Publication Data
US 2016/0173238 A1 Jun. 16, 2016

Related U.S. Application Data

(63) Continuation of application No. 14/567,180, filed on Dec. 11, 2014.

(51) Int. Cl.
*H04L 1/00* (2006.01)
*H04L 1/08* (2006.01)
*H04L 1/16* (2006.01)
*H04L 1/18* (2006.01)

(52) U.S. Cl.
CPC .............. *H04L 1/08* (2013.01); *H04L 1/1607* (2013.01); *H04L 1/1621* (2013.01); *H04L 1/1858* (2013.01)

(58) Field of Classification Search
None
See application file for complete search history.

(56) References Cited

U.S. PATENT DOCUMENTS

| 5,946,347 A * | 8/1999 | Hudson ................... H04L 1/004 370/229 |
| 6,907,460 B2 | 6/2005 | Loguinov et al. |
| 7,586,930 B2 * | 9/2009 | Koski ................... H04L 1/1854 370/312 |
| 8,310,920 B2 | 11/2012 | Goldfein et al. |
| 8,520,673 B2 * | 8/2013 | Chen ............................. 370/312 |
| 8,576,711 B1 | 11/2013 | Roskind et al. |
| 8,773,976 B1 | 7/2014 | Puliatti et al. |

(Continued)

FOREIGN PATENT DOCUMENTS

WO 2009156792 A1 12/2009

OTHER PUBLICATIONS

Fonseca, Nahur, et al.; "Bayesian Packet Loss Detection for TCP", 2005, 12 pages.

(Continued)

*Primary Examiner* — Justin R Knapp
(74) *Attorney, Agent, or Firm* — Edward P. Li

(57) ABSTRACT

A process, a computer program product, and a computer system for redelivering a subset of messages in a packet to a receiver application are provided. The present invention enables the partially received packet to be delivered to the application layer (LLM) and allow LLM to decide whether it has to request for full packet retransmission or partial retransmission of the packet. The present invention allows the LLM of the receiver to generate a PNACK (partial negative-acknowledgement) based on the subset of the messages consumed from within the partial packet. The present invention allows the LLM of the transmitter to process the PNACK, to regenerate a new packet from the original packet to contain only a subset of the messages, and to send this new packet to the receiver who has generated the PNACK.

12 Claims, 5 Drawing Sheets

(56) References Cited

U.S. PATENT DOCUMENTS

| | | | |
|---|---|---|---|
| 2013/0028121 A1 | 1/2013 | Rajapakse | |
| 2014/0379553 A1* | 12/2014 | Hurd | H04L 47/56 705/37 |
| 2016/0173235 A1 | 6/2016 | Naaman et al. | |

OTHER PUBLICATIONS

Proietti, Roberto; "All Optical NACK for Fast Packet Retransmission in AWGR-based Optical Switches"; ECOC Technical Digest; Copyright 2011, 3 pages.

Zhang, Hongwei; "Dependable Messaging in Wireless Sensor Networks"; Ohio State University; 2006, 208 pages.

"WebSphere MQ Low Latency Messaging"; <http://www-03.ibm/com/software/products/en/wmq-llm>; Date Printed Aug. 15, 2014, 2 pages.

"UDP Lite" Wikipedia; <http://en.wikipedia.org/wiki/UDP_Lite>; Printed Aug. 15, 2014, 3 pages.

U.S. Appl. No. 14/567,180, filed Dec. 11, 2014 entitled "Method for Redelivering a Subset of Messages in a Packet to a Receiver Application".

Appendix P "List of IBM Patents or Patent Applications Treated as Related", dated Aug. 20, 2015, 2 pages.

Larzon et al., "Efficient use of wireless bandwidth for multimedia applications", IEEE International Workshop on Mobile Multimedia Communications (MoMuC '99), Nov. 15-17, 1999, San Diego, CA, pp. 187-193.

* cited by examiner

METHOD FOR REDELIVERING A SUBSET OF MESSAGES IN A PACKET TO A RECEIVER APPLICATION

CROSS REFERENCE TO RELATED APPLICATION

This application is a Continuation Application of pending U.S. patent application Ser. No. 14/567,180 filed on Dec. 11, 2014.

TECHNICAL FIELD OF THE INVENTION

The present invention relates generally to a computer network, and more particularly to redelivering a subset of messages in a packet to a receiver application.

BACKGROUND

Financial markets require ultra low latency messaging support, in order for quick trading actions to be performed. IBM WebSphere MQ Low Latency Messaging is an IBM product that provides ultra low latency messaging solution for the financial market. Low Latency Messaging (LLM) provides multicast messaging for high-speed, one-to-many communications through user datagram protocol (UDP) over high speed 10 GbE and InfiniBand networks. LLM and other products use UDP for high speed message transfer, due to the nature of UDP being connectionless protocol. UDP is suitable for applications that need fast and efficient transmission such as games. UDP's stateless nature is also useful for servers that answer small queries from huge numbers of clients. UDP is faster because of its low protocol overhead. In UDP there is no guarantee that a packet sent will reach at all. UDP is lightweight. There is no ordering of messages and tracking connections, etc. It is a small transport layer designed on the top of the IP layer. The primary reason UDP is used (especially in low latency financial market applications) is that UDP is the only option for multicast. For unicast communication, TCP is also a good option, although UDP is sometimes preferred due to its lack of flow/congestion control.

SUMMARY

In one aspect, a method for redelivering a subset of messages in a packet to a receiver application is provided. The method comprises: determining, by a low latency messaging (LLM) application of a receiver in a network, whether at least one complete message is included in a partial packet received from a transmitter in the network, wherein the partial packet is a subset of the packet; generating, by the LLM application, a partial negative acknowledgement (PNACK), in response to determining that the at least one complete message is included in the partial packet, wherein the PNACK includes offset information for missing messages in the partial packet; reconstructing, by the transmitter, a new packet that includes the missing messages, in response to receiving the PNACK form the receiver; in response to determining that the PNACK is received from multiple receivers in the network, sending, by the transmitter, the new packet to the multiple receivers by using multicast; and in response to determining that the PNACK is not received from multiple receivers in the network, sending, by the transmitter, the new packet to the receiver by using unicast.

In another aspect, a computer program product for redelivering a subset of messages in a packet to a receiver application is provided. The computer program product comprises a computer readable storage medium having program code embodied therewith, the program code executable to: determine, by a low latency messaging (LLM) application of a receiver in a network, whether at least one complete message is included in a partial packet received from a transmitter in the network, wherein the partial packet is a subset of the packet; generate, by the LLM application, a partial negative acknowledgement (PNACK), in response to determining that the at least one complete message is included in the partial packet, wherein the PNACK including offset information for missing messages in the partial packet; reconstruct, by the transmitter, a new packet that includes the missing messages, in response to receiving the PNACK form the receiver; in response to determining that the PNACK is received from multiple receivers in the network, send, by the transmitter, the new packet to the multiple receivers by using multicast; and, in response to determining that the PNACK is not received from multiple receivers in the network, send, by the transmitter, the new packet to the receiver by using unicast.

In yet another aspect, a computer system for redelivering a subset of messages in a packet to a receiver application is provided. The computer system comprises one or more processors, one or more computer readable tangible storage devices, and program instructions stored on at least one of the one or more computer readable tangible storage devices for execution by at least one of the one or more processors. The program instructions are executable to determine, by a low latency messaging (LLM) application of a receiver in a network, whether at least one complete message is included in a partial packet received from a transmitter in the network, wherein the partial packet is a subset of the packet. The program instructions are executable to generate, by the LLM application, a partial negative acknowledgement (PNACK), in response to determining that the at least one complete message is included in the partial packet; wherein the PNACK including offset information for missing messages in the partial packet. The program instructions are executable to reconstruct, by the transmitter, a new packet that includes the missing messages, in response to receiving the PNACK form the receiver. The program instructions are executable to send, by the transmitter, the new packet to the multiple receivers by using multicast, in response to determining that the PNACK is received from multiple receivers in the network. The program instructions are executable to send, by the transmitter, the new packet to the receiver by using unicast, in response to determining that the PNACK is not received from multiple receivers in the network.

DETAILED DESCRIPTION

Because the very nature of UDP (user datagram protocol), such as being connectionless, no error-checking, ordering, and no guarantee that the packets are sent to reach all clients, it is necessary to add an additional layer on the top of LLM (low latency messaging) in order to provide the required reliability, ordering, batching, packet retransmission and yet maintaining low latency.

Embodiments of the present invention enable the partially received packet to be delivered to the application layer (LLM) and allow LLM to decide whether it has to request for full packet retransmission or partial retransmission of the packet. Embodiments of the present invention allow a transmitter/sender to create checksum pertaining to each message batched in the packet. The checksum information about each message is stored in the packet header for a receiver to validate whether the partial packet received by the receiver contains one or more complete messages or not. Embodiments of the present invention allow the LLM of the receiver to generate a PNACK (partial negative-acknowledgement) based on the subset of the messages consumed from within the partial packet. Embodiments of the present invention allow the LLM of the transmitter to process the PNACK, to regenerate a new packet from the original packet to contain only a subset of the messages that the receiver can not process, and to send this new packet to the receiver who has generated the PNACK. Embodiments of the present invention allow only the specific LLM receivers that have generated the PNACK to process the partial packet published by the transmitter and all other receivers just ignore the packet.

The present invention has the following advantages. The present invention allows users to achieve low latency messaging delivery model even when there are packet loss. The present invention uses lower network bandwidth by retransmitting the subset of the packet data instead of retransmitting the full packet data. The present invention introduces a new partial acknowledgement mode in order to allow transmitter to reconstruct the packet with only a subset of the payload.

Figure 1:
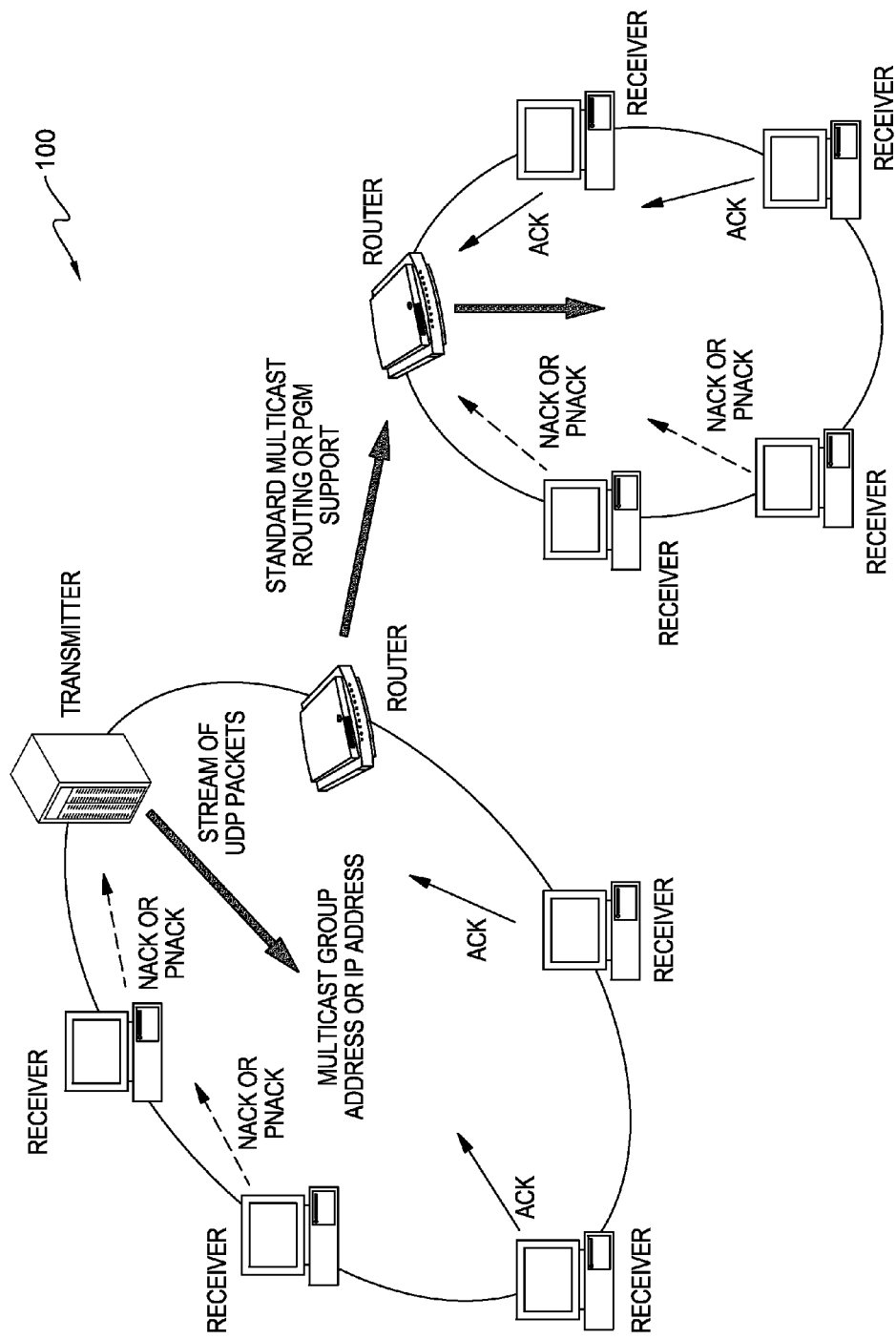
FIG. 1 is a diagram showing a computer network for achieving redelivery of a subset of messages in a packet to a receiver application, in accordance with one embodiment of the present invention.

FIG. 1 is a diagram showing computer network 100 for achieving redelivery of a subset of messages in a packet to a receiver application, in accordance with one embodiment of the present invention. In the embodiment shown in FIG. 1, a transmitter sends packets and all registered receivers receive messages included in the packets. The transmitter sends stream of UDP packets to a multicast group IP address. Shown as in FIG. 1, the packets may also be sent through standard multicast routing or PGM (pragmatic general multicast) support. The nature of UDP being unreliable will not guarantee all the packets reach the destinations—the receivers; the packets or messages in the packets can be lost in the transit. In order to achieve reliability and deal with packet or message loss, the receivers (low latency messaging receivers or LLM receivers) send NACKs (negative-acknowledgements) or PNACKs (partial negative-acknowledgements). A NACK is sent by a receiver when a packet is lost or no complete message in the packet is received. If the NACK is received by the transmitter, the transmitter must send a complete packet again. A PNACK is sent by a receiver when one or more messages in the packet are lost but one or more messages in the packet are received correctly. If the PNACK is received by the transmitter, the transmitter sends a new packet including only the lost one or more messages. As an option, when a packet is transmitted successfully, receivers may send ACKs (acknowledgements) to the transmitter.

Additionally, in order to achieve faster transmission of data, LLM provides batching of multiple messages within a single packet or a single message being split across multiple packets (in case the application message is a large message). This idea is applicable for addressing issues related with handling multiple messages within a single packet (i.e., batching of multiple messages in a single packet) when the network is congested or whenever there are packet loss and the receivers asks for re-transmission of packets. Increasing message batching is also a very effective way of controlling network congestion. Under heavy workloads, batching multiple messages into a single packet can significantly reduce network and CPU resources because message batching results in fewer packets to process, effectively reducing the overhead of processing a packet. By increasing message batching, it reduces the packet rate and alleviates some of the pressure on receiving applications. As a result, receivers are more tolerant of message bursts and less likely to send repair requests (NACKs). Message batching or packet batching is useful during stressful situations. For example, when an application must send a burst of messages, message batching or packet batching is used.

For example, an application or a transmitter sends thousands of messages in quick succession. In the example, each of messages has the size of 1 KB and the size of a packet is 8 KB. Hence, LLM will batch together 7 messages within a single packet shown as below and send it over the network.

| Packet Header | Message 1 | Message 2 | Message 3 | Message 4 | Message 5 | Message 6 | Message 7 |
|---|---|---|---|---|---|---|---|

The above packet shows that LLM has batched 7 messages to be part of the single packet and transmitted over the network. Since the overall packet size is 8 KB and header takes some space, only 7 messages of 1 KB will be accommodated in the packet. Hence, there are several such packets being sent over the network, each of the packets contains multiple messages. Because the UDP is unreliable or because there is network congestion or disturbance in the network, it is quite possible for the packets to get lost. As per the current design of UDP, when the packets are received at a socket level, it is the responsible of the operating system (OS) of the receiver to validate whether the receiver has received the complete packet. If the complete packet has not been received, then the OS itself discards the packet. In some cases discarding the packet is not done at the OS level. For example, in many cases the packet with the bad checksum will be discarded by the NIC (network interface controller) or the NIC driver. The OS never delivers the subset of the packet or partial packet to the LLM layer (the layer directly above the network layer). When new packets arrive, the LLM application verifies the missing packets and generates a NACK for the missing packet; therefore, the LLM application enables the transmitter to resend the missing packet. Also, it is possible that a single large message is split across multiple packets. The larger UDP packet is sent over the network in multiple independent fragments where the size of each fragment is at most the size of the network MTU (maximum transmission unit). IP fragmentation provides an easy way to understand use case where part of the packet can be perfectly reconstructed. Hence, embodiments of the present invention primarily deal with a situation where multiple messages are batched together into a single packet and sent over the network.

In the above example, if the receiver has received 6 KB of packet data and the remaining packet does not arrive, the OS will discard the entire packet. In such situations, even though there are 5 full messages (from application perspective) in the partially received packet, the OS still discards this partial packet, since at the OS level or socket level it has no knowledge about the application payload. In a low latency environment, it is important to deliver messages as quickly as possible; discarding the packet and asking for retransmission will add to the latency. In this situation, even though the receiver had received the packet with 5 messages, the packet is still discarded.

Embodiments of the present invention provide a unique solution to enable partial delivery of packets to the receiver application (LLM in this case) and let the LLM decide whether it can consume part of the messages from within the packet. Embodiments of the present invention provide a mechanism for the transmitter to create checksums for each of the message put within the packet and store the checksum information of individual messages in the header. This multi-checksum information will be used by the receiver to validate whether the receiver has actually received the complete message within the packet. If the LLM is able to consume the subset of the messages, then the LLM generates a PNACK (partial NACK) to request the transmitter to reconstruct the packet such that the transmitter can resend only a subset of the messages within the packet when retransmitting.

Figure 2:
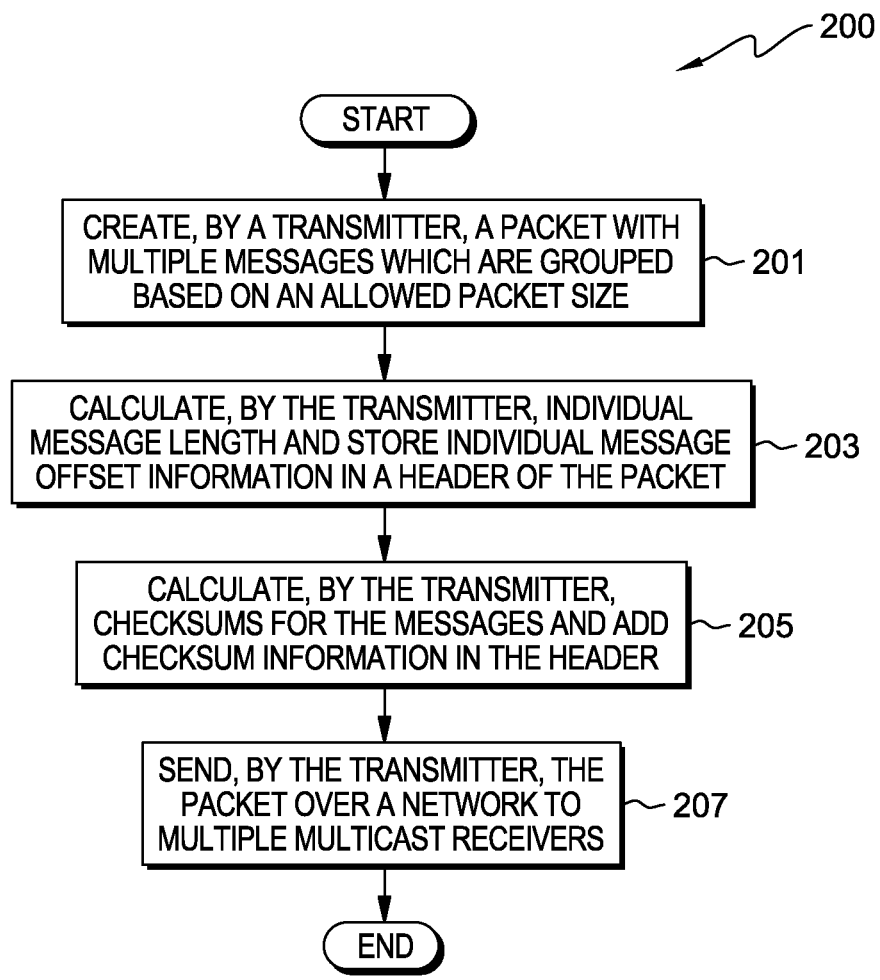
FIG. 2 is a flowchart showing operational steps of constructing a packet by a transmitter in the computer network shown in FIG. 1, in accordance with one embodiment of the present invention.

FIG. 2 is flowchart 200 showing operational steps of constructing a packet by a transmitter in the computer network shown in FIG. 1, in accordance with one embodiment of the present invention. At step 201, the transmitter creates a packet with multiple messages. The multiple messages are grouped into the packet based on an allowed packet size. At step 203, the transmitter calculates individual message length and stores individual message offset information in a header of the packet. At step 205, the transmitter calculates checksums for the multiple messages and adds checksum information in the header. At step 207, the transmitter sends the packet over the computer network to multiple multicast receivers.

Figure 3:
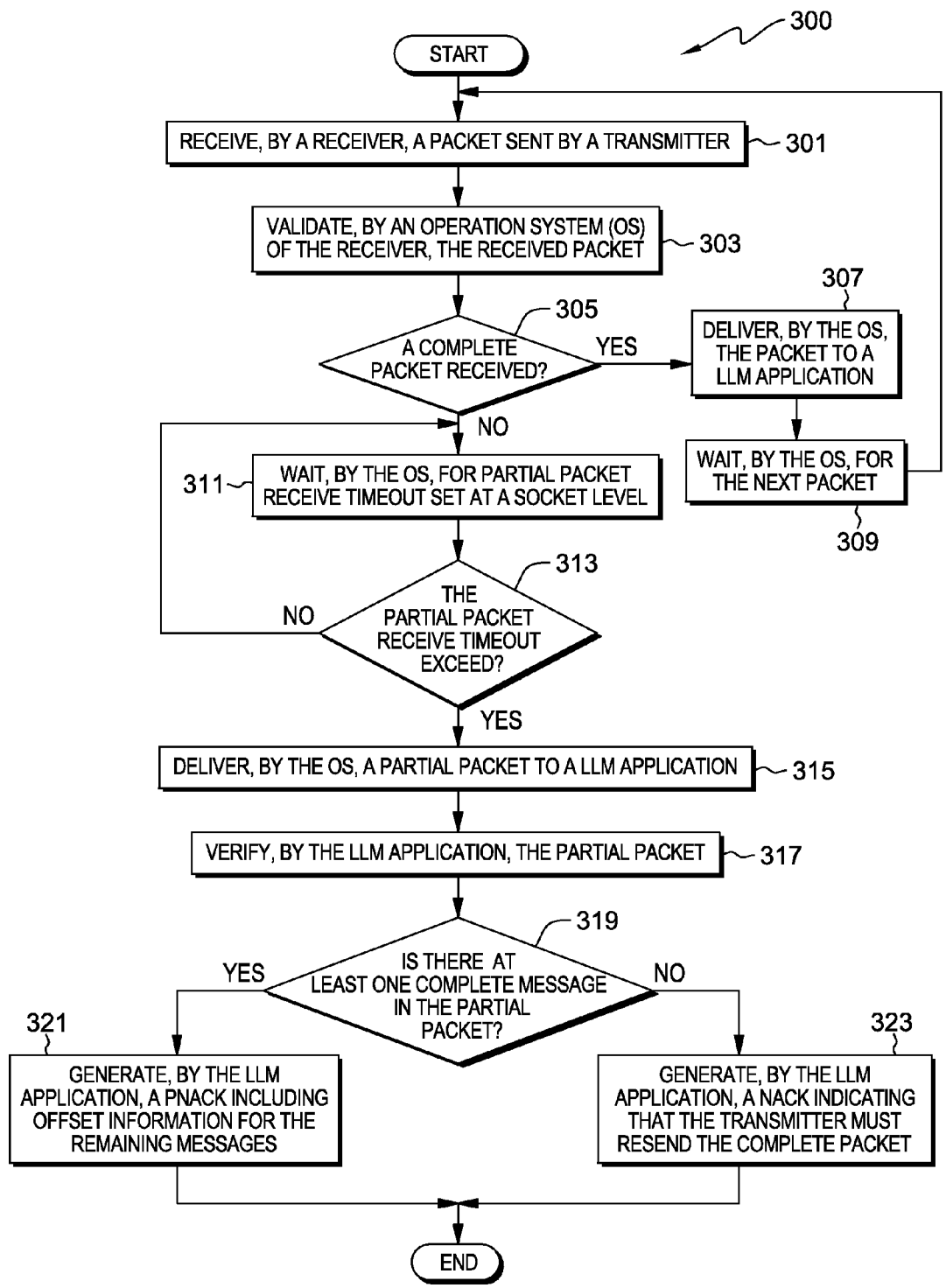
FIG. 3 is a flowchart showing operational steps of a receiver in a computer network shown in FIG. 1, in accordance with one embodiment of the present invention.

FIG. 3 is flowchart 300 showing operational steps of a receiver in a computer network shown in FIG. 1, in accordance with one embodiment of the present invention. At step 301, the receiver receives a packet sent by a transmitter. At step 303, an operating system (OS) of the receiver validates the packet received at step 301. At decision block 305, the OS determines whether a complete packet is received.

In response to determining that the complete packet is received (YES branch of decision block 305), at step 307, the OS delivers the complete packet to a low latency messaging (LLM) application of the receiver. After step 307, the OS at step 309 waits for a next packet and iterates step 301 after receiving the next packet. In response to determining that the complete packet is not received (NO branch of decision block 305), at step 311, the OS waits for partial packet receive timeout that is set at a socket level.

At decision block 313, the OS determines whether the partial packet receive timeout is exceeded. In response to determining that the partial packet receive timeout is not exceeded (NO branch of decision block 313), the OS reiterates step 311. In response to determining that the partial packet receive timeout is exceeded (YES branch of decision block 313), the OS at step 315 delivers a partial packet to the LLM application of the receiver.

At step 317, the LLM application of the receiver verifies the partial packet. At decision block 319, the LLM application determines whether there is at least one complete message in the partial packet. In response to determining that there is at least one complete message in the partial packet (YES branch of decision block 319), at step 321, the LLM application generates a PNACK (partial negative-acknowledgement) which includes offset information of remaining messages (or missing messages that are not received) in the partial packet. The PNACK is a new type of acknowledgement packet and it indicates to the OS to include the offset information that must be sent back to the transmitter. In response to determining that there is no complete message in the partial packet (NO branch of decision block 319), at step 323, the LLM application generates a NACK (negative-acknowledgement) which request the transmitter to resend the complete packet.

Figure 4:
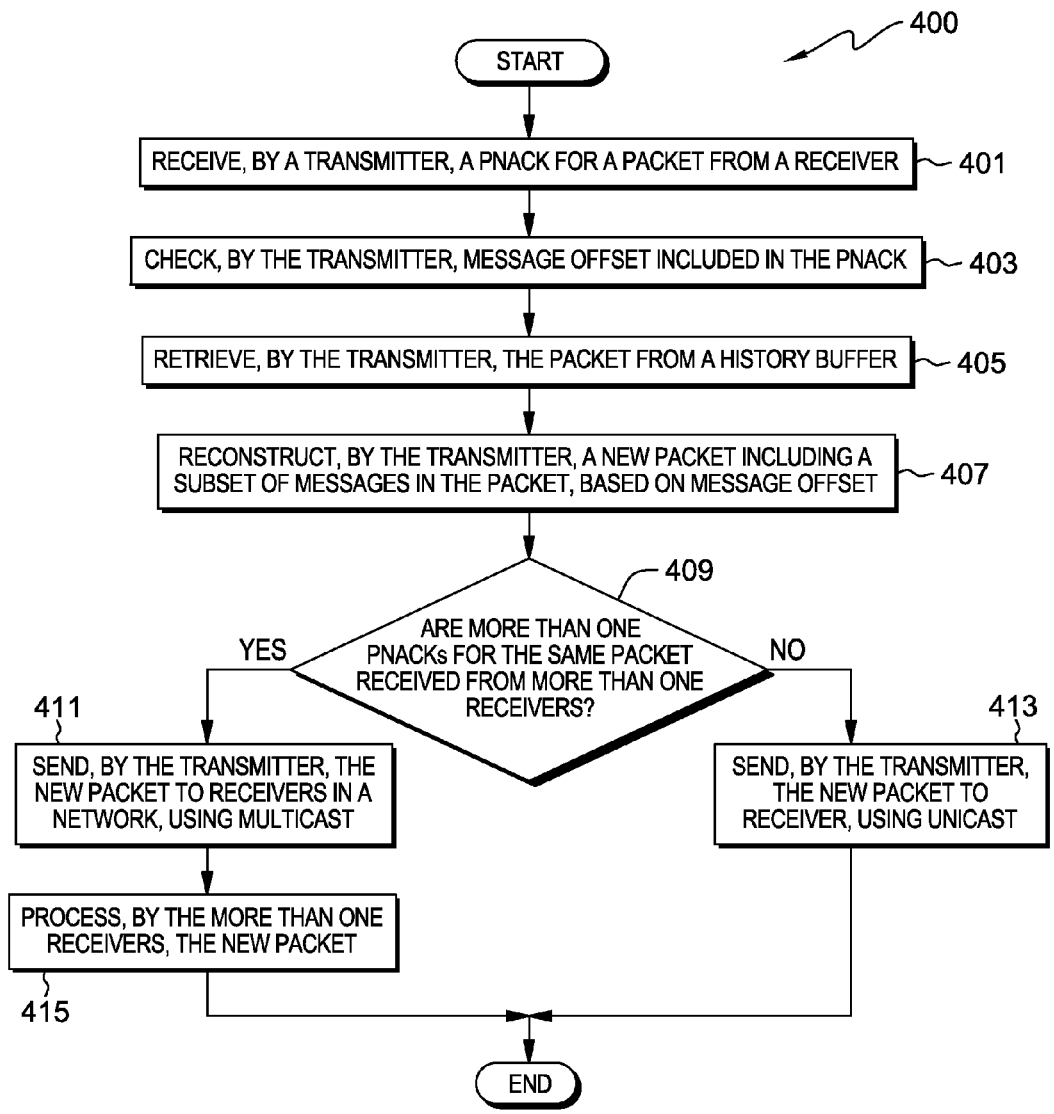
FIG. 4 is a flowchart showing operational steps of a transmitter in a computer network shown in FIG. 1, in accordance with one embodiment of the present invention.

FIG. 4 is flowchart 400 showing operational steps of a transmitter in a computer network shown in FIG. 1, in accordance with one embodiment of the present invention. At step 401, the transmitter receives a PNACK (partial negative-acknowledgement) for a packet. The PNACK requests the transmitter to send a new packet including missing messages that are not received by a receiver in a packet sent by the transmitter. At step 403, the transmitter check message offset included in the PNACK. At step 405, the transmitter retrieves the packet from a history buffer. At step 407, the transmitter reconstructs the new packet which includes a subset of messages in the packet, based on the message offset.

At decision block 409, the transmitter determines whether more than one NPACK for the same packet are received from more than one receiver. In response to determine that more than one NPACK for the same packet are received from more than one receiver (YES branch of decision block 409) at step 411, the transmitter sends the new packet to the more than one receiver in a network, using multicast. Then, at step 415, the more than one receiver process the new packet. At this step, only receivers who send the PNACKs will process the new packet and all other receivers ignore the new packet.

In response to determine that only one NPACK for the packet is received from only one receiver (NO branch of decision block 409), at step 413, the transmitter sends the new packet to the only one receiver who send the NPACK, using unicast.

Figure 5:
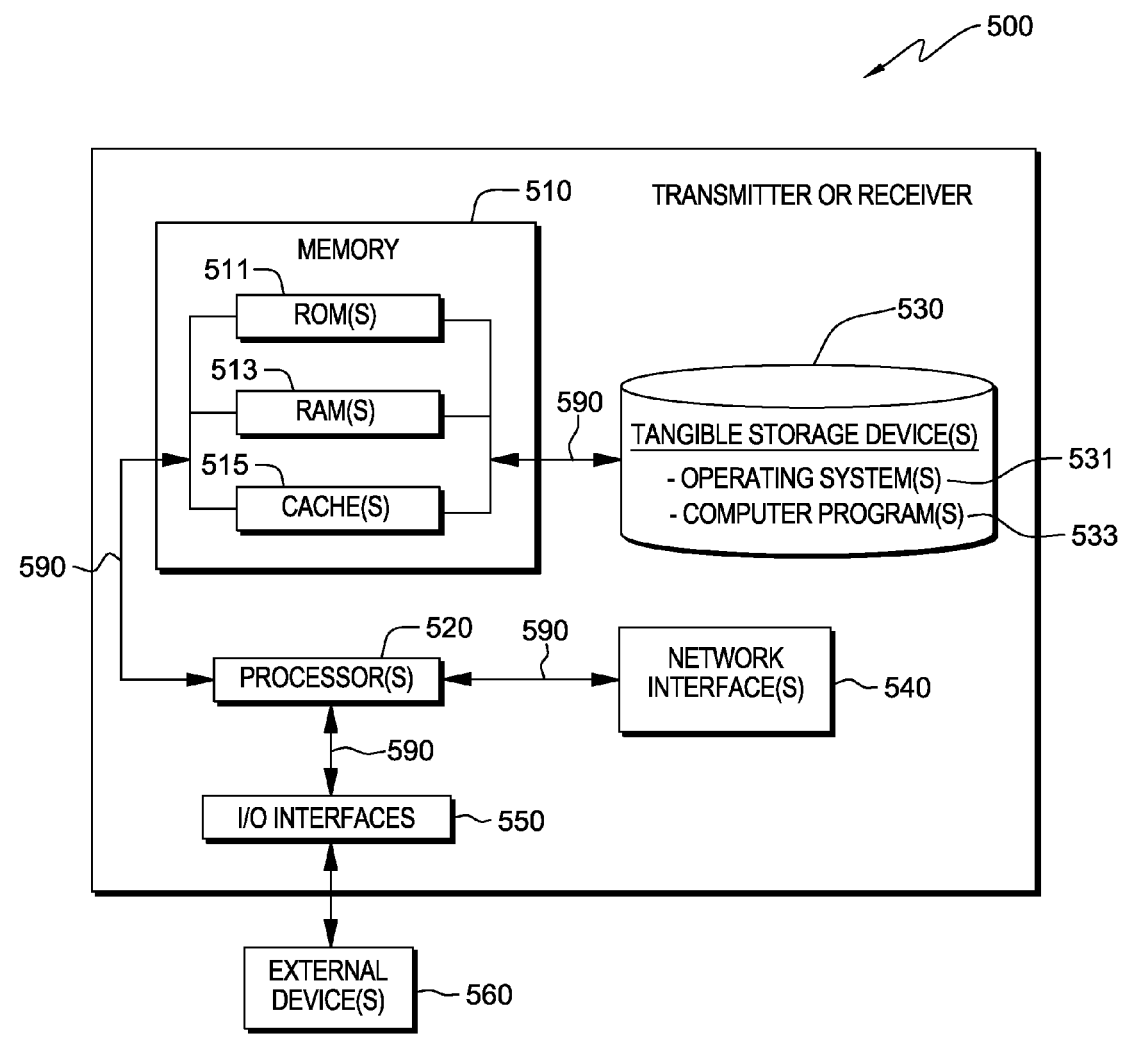
FIG. 5 is a diagram illustrating components of a computer device hosting a transmitter or a receiver shown in FIG. 1, in accordance with one embodiment of the present invention.

FIG. 5 diagram illustrating components of computer device 500 hosting a transmitter or a receiver shown in FIG. 1, in accordance with one embodiment of the present invention. It should be appreciated that FIG. 5 provides only an illustration of one implementation and does not imply any limitations with regard to the environment in which different embodiments may be implemented.

Referring to FIG. 5, computer device 500 includes processor(s) 520, memory 510, tangible storage device(s) 530, network interface(s) 540, and I/O (input/output) interface(s)

550. In FIG. 5, communications among the above-mentioned components of computing device 500 are denoted by numeral 590. Memory 510 includes ROM(s) (Read Only Memory) 511, RAM(s) (Random Access Memory) 513, and cache(s) 515. One or more operating systems 531 and one or more computer programs 533 reside on one or more computer readable tangible storage device(s) 530. One or more computer programs 533 include one or more low latency messaging (LLM) applications. Computing device 500 further includes I/O interface(s) 550. I/O interface(s) 550 allows for input and output of data with external device(s) 560 that may be connected to computing device 500. Computing device 500 further includes network interface(s) 540 for communications between computing device 500 and a computer network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device, such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN), and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, and conventional procedural programming languages, such as the "C" programming language, or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture, including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for redelivering a subset of messages in a packet to a receiver application, the computer program product comprising a computer readable storage medium having program code embodied therewith, the program code executable to:
   determine, by a low latency messaging (LLM) application of a receiver in a network, whether at least one complete message is included in a partial packet received from a transmitter in the network, wherein the partial packet is a subset of the packet;
   generate, by the LLM application, a partial negative acknowledgement (PNACK), the PNACK including offset information for missing messages in the partial packet, in response to determining that the at least one complete message is included in the partial packet;
   reconstruct, by the transmitter, a new packet that includes the missing messages, in response to receiving the PNACK form the receiver;
   in response to determining that the PNACK is received from multiple receivers in the network, send, by the transmitter, the new packet to the multiple receivers by using multicast; and
   in response to determining that the PNACK is not received from multiple receivers in the network, send, by the transmitter, the new packet to the receiver by using unicast.

2. The computer program product of claim 1, further comprising the program code executable to:
   receive, by the receiver, the packet from the transmitter;
   determine, by the receiver, whether a complete packet is received;
   determine, by the receiver, whether receive timeout set at a socket level is exceeded, in response to determining that the complete packet is not received; and
   deliver, by the receiver, the partial packet to a receiver application, in response to determining that the receive timeout is exceeded.

3. The computer program product of claim 2, further comprising the program code executable to:
   deliver, by the receiver, the complete packet to the receiver application, in response to determining that the complete packet is received.

4. The computer program product of claim 1, further comprising the program code executable to:
   generate, by the LLM application, a negative acknowledgement (NACK), the NACK requesting the transmitter to resent a complete packet, in response to determining that no complete message is included in the partial packet.

5. The computer program product of claim 1, wherein the new packet is processed by the receiver or the multiple receivers which send the PNACK to the transmitter, other receivers in the network ignore the new packet.

6. The computer program product of claim 1, wherein the packet comprises multiple messages, wherein the packet comprises a header including offset information and checksum information for each of the multiple messages.

7. A computer system for redelivering a subset of messages in a packet to a receiver application, the computer system comprising:
   one or more processors, one or more computer readable tangible storage devices, and program instructions stored on at least one of the one or more computer readable tangible storage devices for execution by at least one of the one or more processors, the program instructions executable to:
   determine, by a low latency messaging (LLM) application of a receiver in a network, whether at least one complete message is included in a partial packet received from a transmitter in the network, wherein the partial packet is a subset of the packet;
   generate, by the LLM application, a partial negative acknowledgement (PNACK), the PNACK including offset information for missing messages in the partial packet, in response to determining that the at least one complete message is included in the partial packet;
   reconstruct, by the transmitter, a new packet that includes the missing messages, in response to receiving the PNACK form the receiver;
   in response to determining that the PNACK is received from multiple receivers in the network, send, by the transmitter, the new packet to the multiple receivers by using multicast; and
   in response to determining that the PNACK is not received from multiple receivers in the network, send, by the transmitter, the new packet to the receiver by using unicast.

8. The computer system of claim 7, further comprising the program instructions executable to:
   receive, by the receiver, the packet from the transmitter;
   determine, by the receiver, whether a complete packet is received;
   determine, by the receiver, whether receive timeout set at a socket level is exceeded, in response to determining that the complete packet is not received; and
   deliver, by the receiver, the partial packet to a receiver application, in response to determining that the receive timeout is exceeded.

9. The computer system of claim 8, further comprising the program instructions executable to:
   deliver, by the receiver, the complete packet to the receiver application, in response to determining that the complete packet is received.

10. The computer system of claim 7, further comprising the program instructions executable to:
    generate, by the LLM application, a negative acknowledgement (NACK), the NACK requesting the transmitter to resent a complete packet, in response to determining that no complete message is included in the partial packet.

11. The computer system of claim 7, wherein the new packet is processed by the receiver or the multiple receivers which send the PNACK to the transmitter, other receivers in the network ignore the new packet.

12. The computer system of claim 7, wherein the packet comprises multiple messages, wherein the packet comprises a header including offset information and checksum information for each of the multiple messages.

* * * * *